United States Patent [19]

Weiler et al.

[11] Patent Number: 4,844,372

[45] Date of Patent: Jul. 4, 1989

[54] DOUBLE PLATE RETROFIT ASSEMBLY FOR A MEAT GRINDER

[75] Inventors: James G. Weiler, Elkhorn; Richard Buschel, Helenville, both of Wis.

[73] Assignee: Weiler and Company, Inc, Whitewater, Wis.

[21] Appl. No.: 217,548

[22] Filed: Jul. 11, 1988

[51] Int. Cl.4 ............................................. B02C 18/38
[52] U.S. Cl. ................................... 241/82.4; 241/82.5
[58] Field of Search .............................. 241/82.1-82.7

[56] References Cited

U.S. PATENT DOCUMENTS

| | | |
|---|---|---|
| 2,299,093 | 10/1942 | Kaptuller . |
| 3,971,514 | 7/1976 | Martinelli et al. . |
| 4,003,521 | 1/1977 | Hess . |
| 4,036,442 | 7/1977 | Barnes . |
| 4,093,128 | 6/1978 | Barnes . |
| 4,108,387 | 8/1978 | Weiler ................................ 241/82.5 |
| 4,606,505 | 8/1986 | Simonsen . |

FOREIGN PATENT DOCUMENTS 43279  7/1910  Fed. Rep. of Germany ............ 241

OTHER PUBLICATIONS

Advertisement entitled "Double Plate Assembly with Spring-Loaded Knives" by Weiler and Company, Inc.

*Primary Examiner*—Mark Rosenbaum
*Attorney, Agent, or Firm*—Andrus, Sceales, Starke & Sawall

[57] ABSTRACT

A double plate retrofit assembly for a meat grinder includes a centering pin adapted for insertion into a longitudinal bore provided in the feed screw of the meat grinder. Primary and secondary knife holder assemblies are adapted for mounting to the centering pin, and primary and secondary orifice plates are mounted adjacent the primary and secondary knife holder assemblies, respectively. Adapter mounting rings are employed for affixing the orifice plates to the end of the meat grinder. A spring washer mechanism is disposed adjacent each knife holder assembly for biasing the knife holder assemblies against the orifice plates to improve grinding performance. The amount of bias provided by the spring washers is adjustable by adjusting the position of the mounting rings.

14 Claims, 3 Drawing Sheets

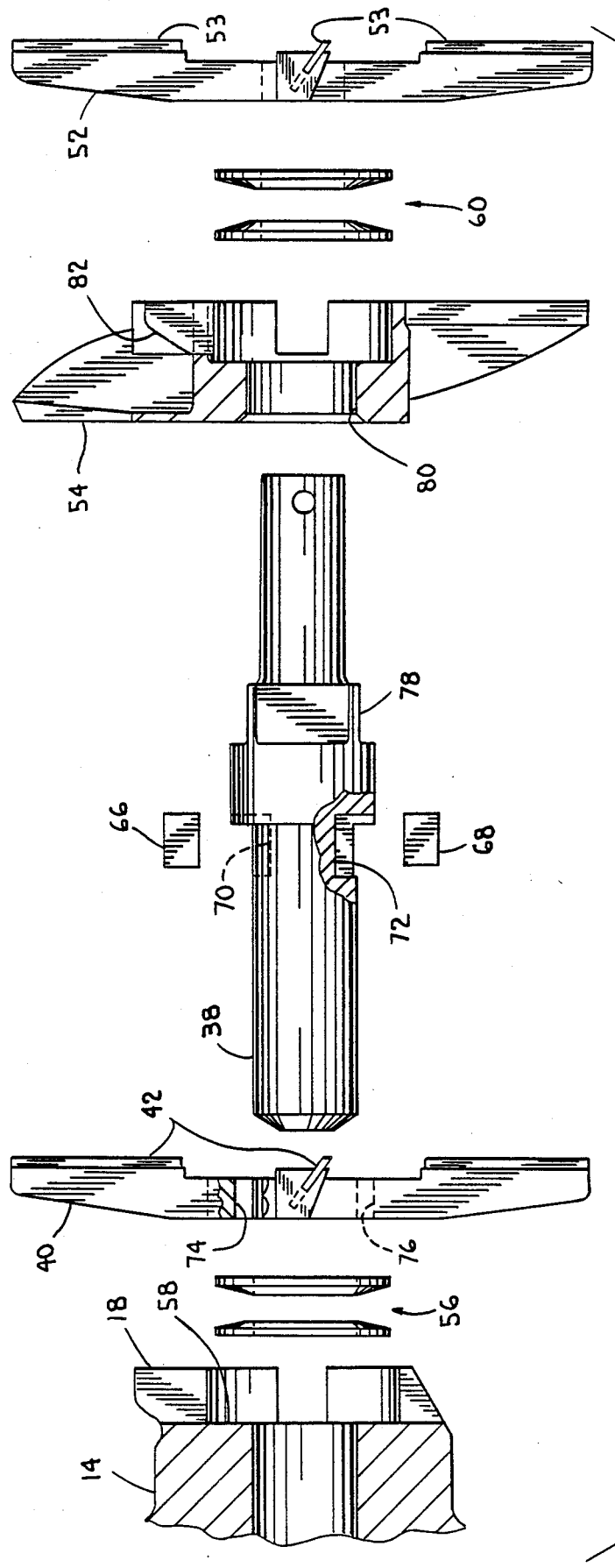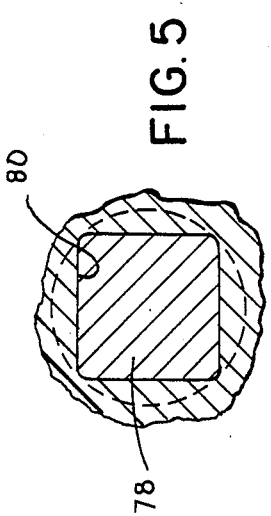

DOUBLE PLATE RETROFIT ASSEMBLY FOR A MEAT GRINDER

BACKGROUND AND SUMMARY

This invention relates to a meat grinder, and more particularly to a meat grinder for performing a multiple stage grinding operation.

It is known to provide a meat grinding assembly which performs dual-phase grinding. One such assembly is shown in U.S. Pat. No. 4,003,521 to Hess. As shown in this patent, an adapter assembly is disclosed which incorporates a secondary orifice plate and a secondary knife assembly for providing a second phase of grinding at the discharge of a grinding machine. Another attachment mechanism for providing dual dual-phase grinding is shown in U.S. Pat. No. 3,971,514 to Martinelli et al.

It is an object of the present invention to provide a retrofit assembly for a meat grinding machine which is readily adapted for use with a conventional feed screw provided on such a machine. It is a further object of the invention to provide such a retrofit assembly which incorporates a feature for biasing the primary and secondary knife assemblies against the primary and secondary orifice plates. Yet another object of the invention is to provide a retrofit assembly for a meat grinder which incorporates a unique drive system for driving the knife assemblies in response to rotation of the feed screw.

The retrofit assembly of the invention is adapted for use with a meat grinder having a rotatable feed screw to which one or more primary cutting elements are mounted at an end thereof adjacent a primary orifice plate. The end of the feed screw has a substantially central longitudinal bore extending throughout a portion of its length. In a single phase grinding operation, the longitudinal bore houses a compression spring which biases the primary cutting elements against the orifice plate. The biasing force provided by the spring is adjustable by means of a threaded bolt which extends through the primary cutting elements and the longitudinal bore in the feed screw and engages an end of the spring. In accordance with the invention, a double plate retrofit assembly for use in connection with such a meat grinder comprises a secondary orifice plate adapted for mounting downstream of the primary orifice plate and spaced therefrom. One or more secondary cutting elements are disposed adjacent the secondary orifice plate and downstream of the primary orifice plate. A mounting pin is provided for mounting the secondary cutting elements to the feed screw, and has a portion adapted for insertion into the longitudinal bore in the end of the feed screw. When so mounted, a portion of the mounting pin projects from the end of the feed screw. The projecting portion of the mounting pin is adapted to receive the primary and secondary cutting elements for mounting such cutting elements thereto. Drive means is interconnected with the projecting portion of the mounting pin for rotatably driving the primary and secondary cutting elements in response to rotation of the feed screw. In a preferred embodiment, an end of the mounting pin is seated at the end of the longitudinal bore in the feed screw. The drive means preferably comprises first engagement means disposed between the end of the feed screw and the primary cutting elements for rotatably driving the primary cutting elements in response to rotation of the feed screw. Second engagement means is disposed between the primary cutting elements and the mounting pin for rotatably driving the mounting pin in response to rotation of the primary cutting elements. Third engagement means is disposed between the mounting pin and the one or more secondary cutting elements for rotatably driving the secondary cutting elements in response to rotation of the mounting pin. The first engagement means preferably comprises one or more drive lugs provided on the end of the feed screw, and the second engagement means preferably comprises key means disposed between the primary cutting elements and the mounting pin for fixing the position of the cutting elements on the mounting pin means. A rotatable impeller is preferably disposed between the primary and secondary orifice plates and mounted to the mounting pin. The third engagement means preferably comprises impeller engagement means for rotatably driving the impeller in response to rotation of the mounting pin, and drive lugs formed on the impeller for rotatably driving the secondary cutting elements in response to rotation of the impeller. Spring means is preferably disposed between the end of the feed screw and the primary cutting elements for biasing the primary cutting elements against the primary orifice plate. Spring means is also provided between the impeller and the secondary cutting elements for biasing the secondary cutting elements against the secondary orifice plate.

BRIEF DESCRIPTION OF THE DRAWINGS

The drawings illustrate the best mode presently contemplated of carrying out the invention.

In the drawings:

FIG. 3 is an exploded elevation view of the double plate retrofit assembly of the invention;

FIG. 5 is a partial sectional view taken generally along line 5—5 of FIG. 2.

DETAILED DESCRIPTION OF THE PREFERRED EMBODIMENT

Figure 1:
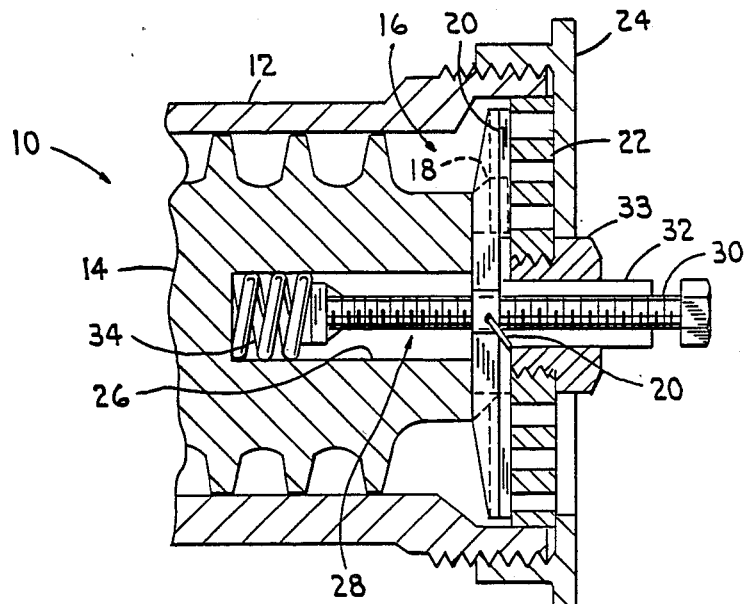
FIG. 1 is a partial sectional view showing a prior art single phase meat grinding machine in which the end of the feed screw is provided with a longitudinal bore.

As shown in FIG. 1, a prior art meat grinder assembly 10 includes a feed screw housing 12 within which a feed screw 14 is rotatably mounted. A knife holder assembly 16 is mounted at the end of feed screw 14 and is rotatably driven by drive lugs, such as 18, formed on the end of feed screw 14. Knife holder assembly 16 maintains a plurality of knives, such as 20, in position adjacent an orifice plate 22 mounted to the end of feed screw housing 12 by means of a mounting ring 24.

The end of feed screw 14 has a central longitudinal bore 26 which houses a hollow pin assembly 28 for biasing knives 20 against orifice plate 22. The construction of hollow pin assembly 28 is set forth in detail in U.S. Pat. No. 4,108,387 to Weiler, incorporated herein by reference. Hollow pin assembly 28 generally includes threaded bolt 30 threadedly connected to a sleeve 32 fixed to orifice plate 22 by means of a collar 33. The leftward end of bolt 30 bears against a spring 34, which is seated in bore 26. Rotation of bolt 30 controls the bias of knives 20 against the inner face of orifice plate 22 provided by spring 34.

Figure 2:
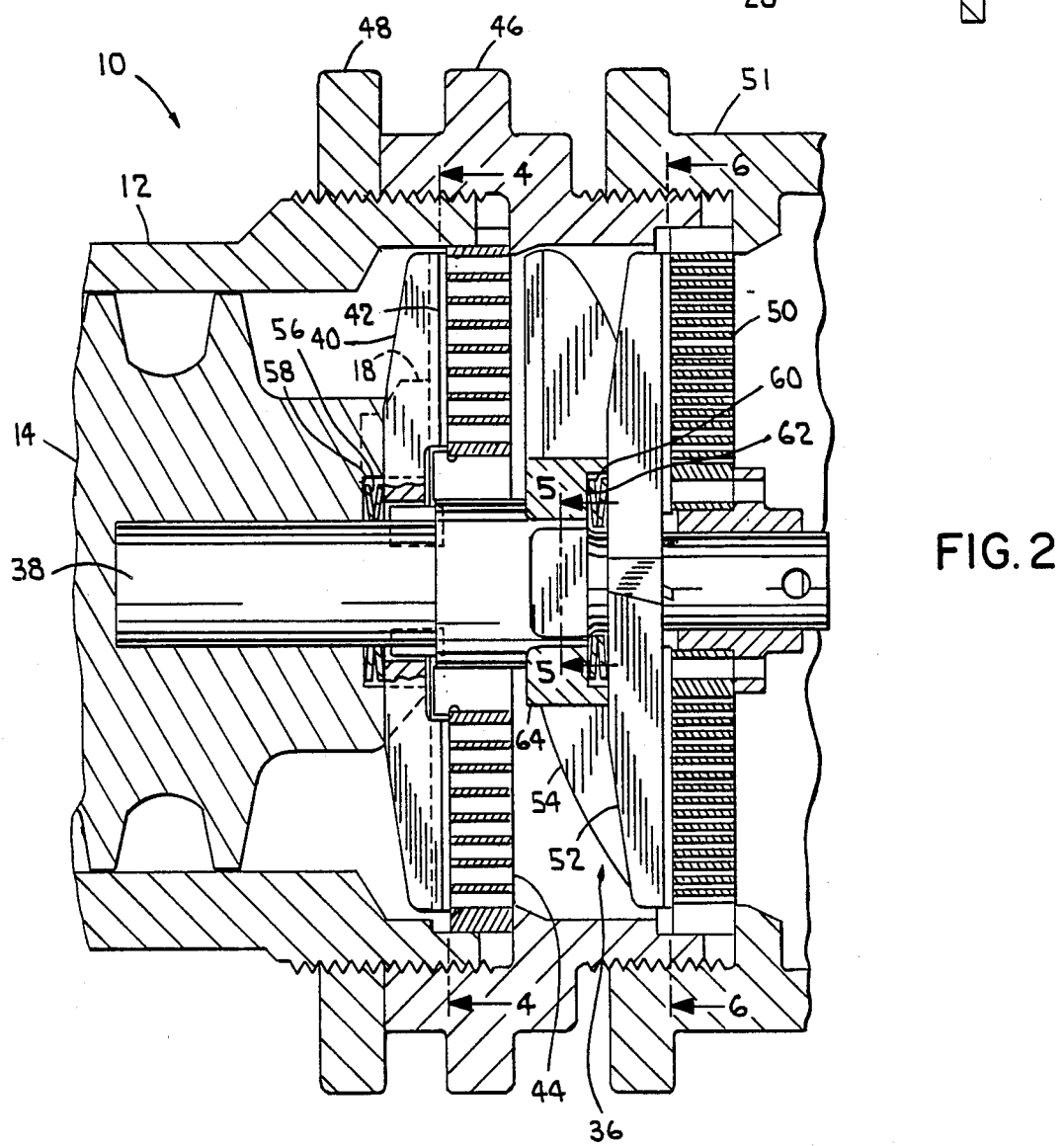
FIG. 2 is a partial sectional view similar to FIG. 1, showing a meat grinding machine provided with the double plate retrofit assembly of the invention.

FIG. 2 illustrates a double plate retrofit assembly 36 adapted for mounting to the discharge end of meat grinder assembly 10 for providing a dual phase grinding operation. To retrofit assembly 10 with double plate assembly 36, knife holder assembly 16, orifice plate 22, mounting ring 24 and hollow pin assembly 28 are removed from auger housing 12 and auger 14. As will be explained, double plate retrofit assembly 36 is then mounted to auger housing 12 and feed screw 14. With this construction, a double plate retrofit assembly is provided which utilizes existing components of a meat grinder assembly, and it is not necessary to provide a specially constructed feed screw.

Double plate assembly 36 includes a mounting or centering pin 38 having a leftward end which is adapted to be seated in the end of bore 26. When so positioned, a portion of centering pin 38 projects rightwardly from the end of feed screw 14. A primary, or inner, knife holder assembly 40 is mounted to centering pin 38 adjacent the end of feed screw 14. Inner knife holder assembly 40 is adapted to receive a plurality of knives, such as shown at 42. A primary orifice plate 44 is mounted adjacent inner knife holder assembly 40 by means of an adapter ring 46 and a lock ring 48, both of which have internal threads engageable with external threads formed on the outer surface of auger housing 12 at the discharge end thereof.

Double plate assembly 36 further includes a secondary orifice plate 50 adapted for mounting at the rightward end of adapter ring 46 by means of a ring 51, such as is provided on a bone collector assembly or the like. An outer knife holder assembly 52 is mounted to the projecting portion of centering pin 38 adjacent secondary orifice plate 50. Knives 53 are mounted to outer knife holder assembly 52 adjacent secondary orifice plate 50. An impeller 54 is mounted to centering pin 38 between primary and secondary orifice plates 44, 50. Impeller 54 acts to transport meat from the downstream side of primary orifice plate 44 to the upstream face of secondary orifice plate 50.

As shown, the orifices in primary orifice plate 44 are larger than those in secondary orifice plate 50, to provide successively smaller dual phase grinding.

An inner spring washer assembly 56 is disposed between a shoulder 58 provided at the rightward end of feed screw 14 and inner knife holder assembly 40. Inner spring washer assembly 56 acts to bias inner knife holder assembly 40 against inner orifice plate 44. With such biasing, the grinding performance provided by the interaction between inner knives 42 and inner orifice plate 44 is improved. Such biasing of knives 42 against orifice plate 44 reduces product heat rise as it passes through orifice plate 44 and also improves particle definition during grinding. The amount of bias provided by inner spring 56 is controllable by adjusting the position of adapter ring 46 on the external threads provided at the discharge end of auger housing 12. That is, turning adapter ring 46 so that it moves leftwardly increases the bias provided by spring washer assembly 56, while turning adapter ring 46 so that it moves rightwardly decreases such bias.

In a similar manner, an outer spring washer assembly 60 is disposed between outer knife holder assembly 52 and an inner shoulder 62 formed in the hub 64 of impeller 54. The bias provided by outer spring washer assembly 60 is adjustable by adjusting the position of outer ring 51 on the external threads provided on adapter ring 46.

Figure 4:
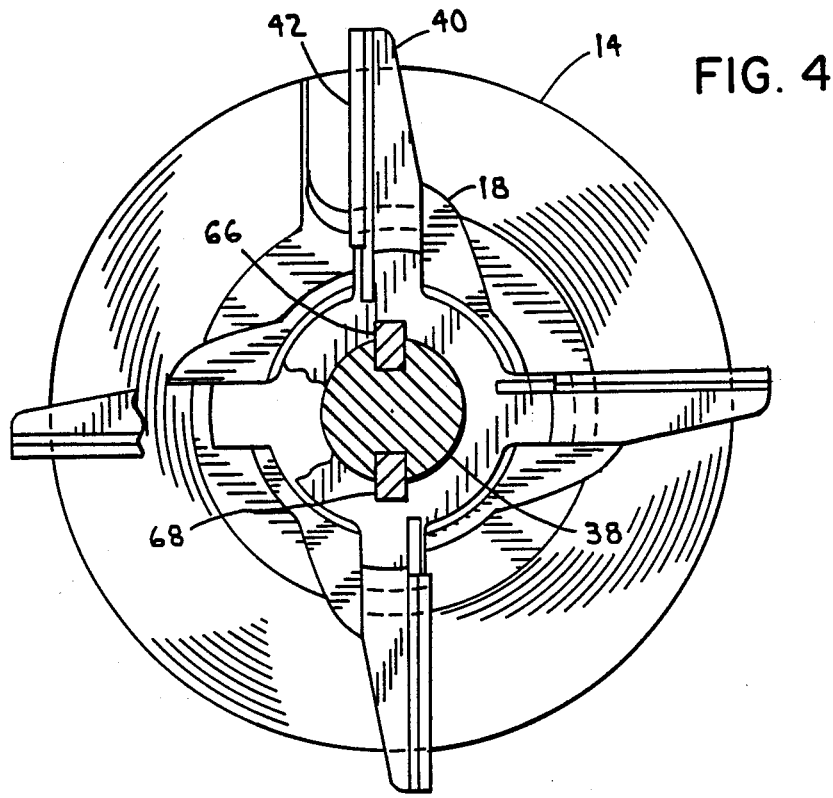
FIG. 4 is a partial sectional view taken generally along line 4—4 of FIG. 2.

A drive means is associated with the projecting portion of centering pin 38 for imparting rotation to inner and outer knife holder assemblies 40, 52 in response to rotation of feed screw 14. As was previously described, the rightward end of feed screw 14 is provided with a series of drive lugs, such as 18, which engage and rotatably drive inner knife holder 40 in response to rotation of feed screw 14. As shown in FIGS. 3 and 4, a pair of keys 66, 68 are adapted for placement within a pair of diametrically opposed keyways 70, 72 provided in centering pin 38. Keys 66, 68 also mate with a pair of inwardly facing slots 74, 76 provided in the central passage through inner knife holder assembly 40. With this construction, rotation of inner knife holder assembly 40 caused by rotation of feed screw 14 is transferred through keys 66, 68 to centering pin 38.

Centering pin 38 is provided with a square hub portion 78 (FIGS. 3 and 5), which is adapted to mate with a square central opening 80 formed in impeller 54. In this manner, rotation of centering pin 38 is transferred to impeller assembly 54.

Figure 6:
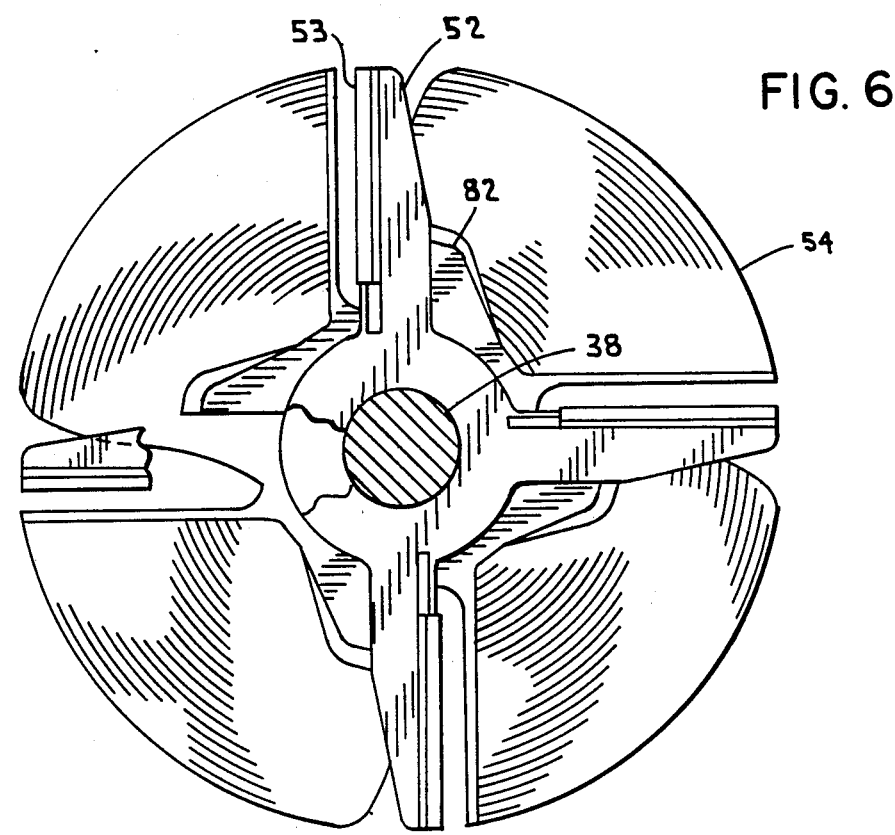
FIG. 6 is a partial sectional view taken generally along line 6—6 of FIG. 2.

As shown in FIG. 6, impeller assembly 54 is provided with a series of drive lugs 82 which engage outer knife holder assembly 52. In this manner, rotation of impeller assembly 54 caused by rotation of centering pin 38 is transferred to outer knife holder assembly 52.

With the described construction, a double plate retrofit assembly is provided for a meat grinder which allows use of all major components of the originally installed grinder. It is not necessary to provide a specially machined feed screw, as was required in some prior art constructions. The retrofit assembly of the invention is advantageous in that, to install the assembly, all that need be done is to remove certain parts from an existing machine and replace such parts with the retrofit assembly of the invention.

Various alternatives and modifications are contemplated as being within the scope of the following claims particularly pointing out and distinctly claiming the invention.

We claim:

1. A double plate retrofit assembly for a meat grinder or the like, said grinder having a rotatable feed screw to which one of more first cutting elements are mounted adjacent an end thereof, said end of said feed screw having a substantially central longitudinal bore defined by one or more inner walls, said bore extending throughout a portion of the length of said feed screw, said first cutting elements being disposed adjacent a first orifice plate, said double plate retrofit assembly comprising:

a second orifice plate adapted for mounting downstream of said first orifice plate and spaced therefrom;

one or more second cutting elements disposed adjacent said second orifice plate and downstream of said first orifice plate;

mounting pin means having a portion adapted for insertion into said longitudinally extending bore provided in said feed screw and a portion projecting from the end of said feed screw, said portion of said mounting pin means adapted for insertion into said bore being not engaged with the one or more inner walls defining said bore, said projecting portion of said mounting pin means being adapted to receive said one or more first cutting elements and said one or more second cutting elements for mounting said cutting elements thereto; and drive means disposed between said feed screw and the portion of said mounting pin means projecting from the end of said feed screw for rotatably driving said mounting pin means and said one or more first and second cutting elements in response to rotation of said feed screw.

2. The double plate retrofit assembly according to claim 1, wherein said one or more second cutting elements are disposed between said first and second orifice plates.

3. The double plate retrofit assembly according to claim 1, wherein said drive means comprises:

first engagement means disposed between the end of said feed screw and said one or more first cutting elements for rotatably driving said first cutting elements in response to rotation of said feed screw;

second engagement means disposed between said first cutting elements and said mounting pin means for rotatably driving said mounting pin means in response to rotation of said first cutting elements; and third engagement means disposed between said one or more second cutting elements and said mounting pin means for rotatably driving said second cutting elements in response to rotation of said mounting pin means.

4. The double plate retrofit assembly according to claim 3, wherein said first engagement means comprises one or more drive lugs disposed on the end of said feed screw and engageable with said one or more first cutting elements for rotatably driving said first cutting elements in response to rotation of said feed screw.

5. The double plate retrofit assembly according to claim 3, wherein said second engagement means comprises key means disposed between said first cutting elements and said mounting pin means and engageable with facing slots formed therein for rotatably driving said mounting pin means in response to rotation of said first cutting elements.

6. The double plate retrofit assembly according to claim 3, further comprising rotatable impeller means disposed between said first and second orifice plates and mounted to said mounting pin means.

7. The double plate retrofit assembly according to claim 6, wherein said third engagement means comprises impeller engagement means disposed between said mounting pin means and said impeller means for rotatably driving said impeller means in response to rotation of said mounting pin means, and second cutting element engagement means disposed between said impeller means and said second cutting elements for rotatably driving said second cutting elements in response to rotation of said impeller means.

8. The double plate retrofit assembly according to claim 7, wherein said impeller engagement means comprises a non-circular portion provided on said mounting pin means adapted to mate with a non-circular opening provided in said impeller means for rotatably driving said impeller means in response to rotation of said mounting pin means.

9. The double plate retrofit assembly according to claim 7, wherein said second cutting element engagement means comprises one or more drive lugs provided on said impeller means and engageable with said one or more second cutting elements for rotatably driving said one or more second cutting elements in response to rotation of said impeller means.

10. The double plate retrofit assembly according to claim 1, further comprising first spring means for biasing said one or more first cutting elements toward said first orifice plate, and second spring means for biasing said one or more second cutting elements toward second orifice plate.

11. The double plate retrofit assembly according to claim 10, wherein said first and second ring comprise spring washer means.

12. An assembly for grinding meat or the like, comprising:

a feed screw housing having a discharge end;

a rotatably driven feed screw disposed within said housing and having an end adjacent the discharge end of said feed screw housing, with said end of said feed screw having a substantially central bore defined by one or more inner walls, said bore extending longitudinally throughout a portion of the length of said feed screw;

a mounting pin having a portion disposed within the longitudinal bore of said feed screw and a portion projecting therefrom, said portion disposed within the bore of said feed screw being not engaged with the one or more inner walls defining said bore;

a first orifice plate disposed at the discharge end of said feed screw housing;

first rotatable cutting means mounted to said mounting pin and disposed adjacent said first orifice plate;

a second orifice plate mounted downstream of said first orifice plate;

second rotatable cutting means mounted to said mounting pin and disposed downstream of said first cutting means and adjacent said second orifice plate; and drive means disposed between said feed screw and the portion of said mounting pin projecting from the end of said feed screw for rotatably driving said mounting pin and said first and second cutting means in response to rotation of said feed screw.

13. A double plate retrofit assembly for a meat grinder of the like, said grinder having a rotatable feed screw to which one or more first cutting elements are mounted adjacent an end thereof, said end of said feed screw having a substantially central longitudinal bore extending throughout a portion of the length of said feed screw, said first cutting elements being disposed adjacent a first orifice plate, said double plate retrofit assembly comprising:

a second orifice plate adapted for mounting downstream of said first orifice plate and spaced therefrom;

one or more second cutting elements disposed adjacent said second orifice plate and downstream of said first orifice plate;

mounting pin means having a portion adapted for insertion into said longitudinally extending bore provided in said feed screw and a portion projection from the end of said feed screw, said projecting portion of said mounting pin means being adapted to mount said one or more first cutting elements and said one or more second cutting elements;

means disposed between said one or more first cutting elements and said feed screw for rotatably driving said one or more first cutting elements in response to rotation of said feed screw;

pin drive means disposed between said one or more first cutting elements and said mounting pin means for directly rotatably driving said mounting pin means solely in response to rotation of said one or more first cutting elements; and means for rotatably driving said one or more second cutting elements in response to rotation of said one or more first cutting elements.

14. An assembly for grinding meat or the like, comprising:

a feed screw housing having a discharge end;

a rotatably driven feed screw disposed within said housing and having an end adjacent the discharge end of said feed screw housing, with said end of said feed screw having a substantially central bores extending longitudinally throughout a portion of the length of said feed screw;

a mounting pin having a portion disposed within the longitudinal bore of said feed screw and a portion projecting therefrom;

a first orifice plate disposed at the discharge end of said feed screw housing;

first rotatable cutting means mounted to said mounting pin and disposed adjacent said first orifice plate, said first rotatable cutting means being rotatably driven in response to rotation of said feed screw;

a second orifice plate mounted downstream of said first orifice plate;

second rotatable cutting means mounted to said mounting pin and disposeds downstream of said first cutting means and adjacent said second orifice plate;

pin drive means disposed between said first rotatable cutting means and said mounting pin for directly rotatably driving said mounting pin solely in response to rotation of said first rotatable cutting means; and means for rotatably driving said second rotatable cutting means in response to rotation of said first rotatable cutting means.

* * * * *

UNITED STATES PATENT AND TRADEMARK OFFICE
CERTIFICATE OF CORRECTION

PATENT NO. : 4,844,372
DATED : July 4, 1989
INVENTOR(S) : WEILER, JAMES G. ET AL It is certified that error appears in the above-identified patent and that said Letters Patent is hereby corrected as shown below:

Claim 1, Col. 4, Line 3, delete "of" and substitute therefor --- or ---;
Claim 11, Col. 6, Line 10, delete "ring" and substitute therefor --- spring means ---.
Claim 13, Col. 6, Line 43, delete "of" and substitute therefor --- or ---.
Claim 13, Col. 6, Lines 59-60, delete "projection" and substitute therefor --- projecting ---.
Claim 14, Col. 7, Line 15, delete "bores" and substitute therefor --- bore ---.
Claim 14, Col. 8, Line 10, delete "disposeds" and substitute therefor --- disposed ---.

Signed and Sealed this

Twenty-third Day of April, 1991

Attest:

HARRY F. MANBECK, JR.

*Attesting Officer*  *Commissioner of Patents and Trademarks*